UNITED STATES PATENT OFFICE.

JOHN A. MIDDLETON, OF NEW YORK, N. Y., ASSIGNOR TO WILLIAM S. MIDDLETON, OF SAME PLACE.

IMPROVEMENT IN COMPOSITIONS FOR CEMENT PIPES.

Specification forming part of Letters Patent No. 133,874, dated December 10, 1872.

*To all whom it may concern:*

Be it known that I, JOHN A. MIDDLETON, of New York city, in the State of New York, have made a certain invention relating to Pipes for Draining and other purposes, of which the following is a specification:

The pipes may be molded with provisions for allowing for the shrinkage in cooling, as set forth in a patent allowed to John S. Rouke, July 15, 1872. I believe, however, that other modes of molding may be employed, and that pipes differently proportioned and variously strengthened by metal within the mass or otherwise, may be made from the same composition. My invention relates to the materials employed, and the proportions and conditions in which they are applied together.

I take one hundred and sixty-five (165) pounds of clean sand, twenty-five (25) pounds of pulverized clay, and twenty (20) pounds of pulverized limestone, and having thoroughly dried and heated and also intimately mingled these materials in an elevated kettle or other vessel provided with a suitable agitator, I discharge the mingled earthy matter into a lower kettle provided with a rotary or other suitable agitator, and flow over the whole a stratum of melted resin, the ordinary pine resin of commerce, previously melted in a kettle or tank. I draw the resin from the bottom of such reservoir, thereby obtaining a homogeneous and hard material, any light material, as resin-oil, floating on the top, and being thereby left to be subsequently utilized for other purposes. The above named quantities of earthy material will require about eighteen (18) pounds of resin. A fire under the mixing-kettle raises the whole to a high temperature, about 750° Fahrenheit, while the rotating mixer, supported in suitable bearings above, incorporates the resin, first with the upper particles of the earthy matter, and afterward with those which lie deeper, until the whole is mingled in a uniform semi-fluid mass. I now draw the fire, or direct the current of heated gases therefrom in another direction—as, for example, under another kettle, which may be worked in connection therewith—and allow this kettle with its contents to cool to about 400° Fahrenheit, at which temperature it is transferred as rapidly and as thoroughly as possible to the interior of the previously-prepared molds, and the kettle is now ready for another batch.

I do not claim the combination of caustic alkalies or caustic alkaline earths with resin as a cementing material for the formation of artificial stone, as they act chemically upon the resin, or saponify it, and render it easily soluble. But limestone or its equivalent marble and crystalized carbonate of lime harden it, and form a cement with the sand, clay, and other materials used.

What I claim, and desire to secure by Letters Patent, is—

1. The combination of pulverized limestone or carbonate of lime with resin to form a cement in the manufacture of artificial stone, as and for the purpose set forth.

2. The process of forming pipes by combining earthy and resinous materials with mechanical agitation at a temperature above that at which the fluid condition is induced, and allowing the same to cool again nearly to the setting temperature before molding, all substantially as herein specified.

In testimony whereof I have hereunto set my hand this 29th day of August, 1872, in the presence of two subscribing witnesses.

J. A. MIDDLETON.

Witnesses:
  WM. C. DEY,
  C. RAETTIG.